(12) United States Patent
Yoon

(10) Patent No.: US 6,726,157 B2
(45) Date of Patent: Apr. 27, 2004

(54) AUTOMATICALLY COLLAPSIBLE PROP

(75) Inventor: Kyung-Bun Yoon, Kyungki-do (KR)

(73) Assignee: Q-Boak Sports, Inc. (KR)

( * ) Notice: Subject to any disclaimer, the term of this patent is extended or adjusted under 35 U.S.C. 154(b) by 0 days.

(21) Appl. No.: 10/186,293

(22) Filed: Jun. 27, 2002

(65) Prior Publication Data

US 2003/0015634 A1 Jan. 23, 2003

Related U.S. Application Data

(63) Continuation-in-part of application No. 10/092,019, filed on Mar. 6, 2002, now Pat. No. 6,572,060.

(30) Foreign Application Priority Data

Mar. 10, 2001 (KR) .......................................... 2001-12483
Apr. 6, 2001 (KR) .......................................... 2001-18160

(51) Int. Cl.⁷ ............................................. A63B 55/04
(52) U.S. Cl. .................... 248/97; 248/96; 248/163.1; 248/166; 248/167; 206/315.3; 206/315.7; 206/315.8
(58) Field of Search .................. 248/188.5, 188.8, 248/96, 97, 163.1, 166, 167; 206/315.3, 315.7, 315.8

(56) References Cited

U.S. PATENT DOCUMENTS

| | | | | | |
|---|---|---|---|---|---|
| 1,738,242 A | * | 12/1929 | Gunther | ........................ | 248/96 |
| 2,282,842 A | * | 5/1942 | Abell | ........................ | 248/96 |
| 2,633,317 A | * | 3/1953 | Marsh | ........................ | 248/96 |
| 4,506,854 A | * | 3/1985 | Kim | ........................ | 248/96 |
| 4,798,357 A | * | 1/1989 | Cho | ........................ | 248/96 |
| 5,154,377 A | * | 10/1992 | Suk | ........................ | 248/96 |
| 5,407,155 A | * | 4/1995 | Chung | ........................ | 248/96 |
| 5,464,180 A | * | 11/1995 | Cheng | ........................ | 248/96 |
| 5,597,144 A | * | 1/1997 | Lee | ........................ | 248/96 |
| 5,662,296 A | * | 9/1997 | Wu | ........................ | 248/96 |
| 5,816,544 A | * | 10/1998 | Hsieh | ........................ | 248/96 |
| 5,829,719 A | * | 11/1998 | Han | ........................ | 248/96 |
| 5,860,521 A | * | 1/1999 | Wu | ........................ | 206/315.7 |
| RE36,366 E | * | 11/1999 | Suk | ........................ | 248/96 |
| 6,481,674 B1 | * | 11/2002 | Lin | ........................ | 248/96 |

FOREIGN PATENT DOCUMENTS

| | | | | |
|---|---|---|---|---|
| GB | 2 214 432 | * | 11/1987 | ........... A63B/57/00 |
| JP | 407067993 A | * | 3/1995 | ........... A63B/55/06 |

OTHER PUBLICATIONS

US Patent Publication US2002/001747, to Rhee, Feb. 2002.*

* cited by examiner

Primary Examiner—Ramon O. Ramirez
Assistant Examiner—Amy J. Sterling
(74) Attorney, Agent, or Firm—Harness, Dickey & Pierce, P.L.C.

(57) ABSTRACT

An automatically collapsible prop for propping a golf bag or the like is provided and includes a frame having a top and bottom part. A rack member is fixedly attached to the top part and includes a central guide rail formed between two side tooth members having a number of elongated parallel teeth. A slide mechanism includes a support part guided by the guide rail and a pair of pinion supports. Two pinions are rotatably mounted on the respective pinion supports of the slide mechanism so as to engage the respective side teeth. Two legs are respectively connected to the pinions. A lever rod is fastened to the slide mechanism with one end projecting upward through the support part of the slide mechanism. A coil spring is provided between the support part of the slide mechanism and the top part to normally push the slide mechanism downward.

18 Claims, 6 Drawing Sheets

AUTOMATICALLY COLLAPSIBLE PROP

CROSS REFERENCE TO RELATED APPLICATION

This application is a continuation-in-part of U.S. patent application Ser. No. 10/092,019 filed Mar. 6, 2002 now U.S. Pat. No. 6,572,060.

BACKGROUND OF THE INVENTION

1. Field of the Invention

The present invention relates to a prop for propping a golf bag.

2. Description of the Related Art

A conventional prop or support structure permanently attached to a golf bag comprises a pair of legs that may be spread and held in a triangular form by corresponding auxiliary poles manually pushed outward when the golf bag is placed down on the ground. Such conventional prop has disadvantages that the legs must be permanently attached to the bag to prop, and may only be worked by manually spreading or collapsing the auxiliary poles cooperatively associated with the respective legs. Another disadvantage of the conventional prop is that the legs are so rapidly spread that the user often worries lest they strike him or other persons.

SUMMARY OF THE INVENTION

It is an object of the present invention to provide a prop for securely supporting a golf bag which comprises a pair of legs detachably attached to the golf bag without requiring auxiliary poles for helping spread the legs into a triangular rest position.

It is another object of the present invention to provide a prop for securely supporting a golf bag that enables the user to comfortably spread the legs without worrying lest they strike him or other persons.

It is still anther object of the present invention to provide a prop for securely supporting a golf bag that may be automatically collapsed into the original carriage position.

According to one aspect of the present invention, an automatically collapsible prop for propping a golf bag having a frame with a top and a bottom shaping part, comprises:

- a plurality of rigid poles for connecting the top and bottom shaping parts so as to form a space approximating the length of a golf club between them;
- a rack member fixedly attached to the top shaping part having a central guide rail part formed between two side tooth parts with a number of elongated parallel teeth, the side tooth parts being inclined toward the inside of the golf bag symmetrically to each other;
- a slide mechanism having a central support part held and guided by the guide rail part, and a pair of pinion support parts symmetrically and integrally formed with the central support part;
- a pair of pinions rotatably mounted on the respective pinion support parts of the slide mechanism so as to respectively engage the two side tooth parts;
- a pair of legs respectively connected to the pair of pinions;
- a lever rod fastened to the slide mechanism with its one end part projected upward through the central support part of the slide mechanism for moving upward the slide mechanism by pushing the other end against the ground;
- a through threaded hole formed in the top shaping part for receiving the one end part of the lever rod;
- a screw cap made with a hollow to receive the one end of the lever rod for closing the upper end of the through threaded hole by engaging its threads; and
- a coil spring mounted between the central support part of the slide mechanism and the lower end of the screw cap for normally pushing the slide mechanism downward, wherein if the other end of the lever rod is pushed against the ground, the slide mechanism moves upward overcoming the resilient force of the coil spring so as to rotate the pinions engaged by the side tooth parts and thus to spread the pair of legs into a triangular rest position with respect to the inner frame, while if the other end of the lever rod is released from the ground, the slide mechanism moves downward by the resilient force of the coil spring so as to reversely rotate the pinions and thus to collapse the pair of legs into the original carriage position.

Preferably, the guide rail part comprises a pair of rails with approximately L-shaped cross sections symmetrically arranged to each other, and the central support part is provided with a pair of grooves for respectively and slidingly catching the pair of rails.

Preferably, the pinions are respectively provided with leg connectors for detachably attaching the legs. The lever rod is fastened to the slide mechanism at a point of the central support part by means of a screw. The projected length of the lever rod from the central support part is long enough to go into the inlet of the through threaded hole. The pinions have teeth only formed on the portions of their respective peripheries to contact the side tooth parts during operation.

Preferably, the pinions have pinion stopper planes formed at the ends of their tooth parts that most strongly contact the side tooth parts in the triangular rest position. The side tooth parts have rack stopper planes for contacting their respective ones of the pinion stopper planes at the corresponding positions.

Preferably, the coil spring is interposed between the lower end of the screw cap and a seat formed on the upper end of the central support part surrounding a part of the lever rod.

The present invention will now be described more specifically with reference to the drawings attached only by way of example.

BRIEF DESCRIPTION OF THE ATTACHED DRAWINGS

DETAILED DESCRIPTION OF THE PREFERRED EMBODIMENT

Figure 1:
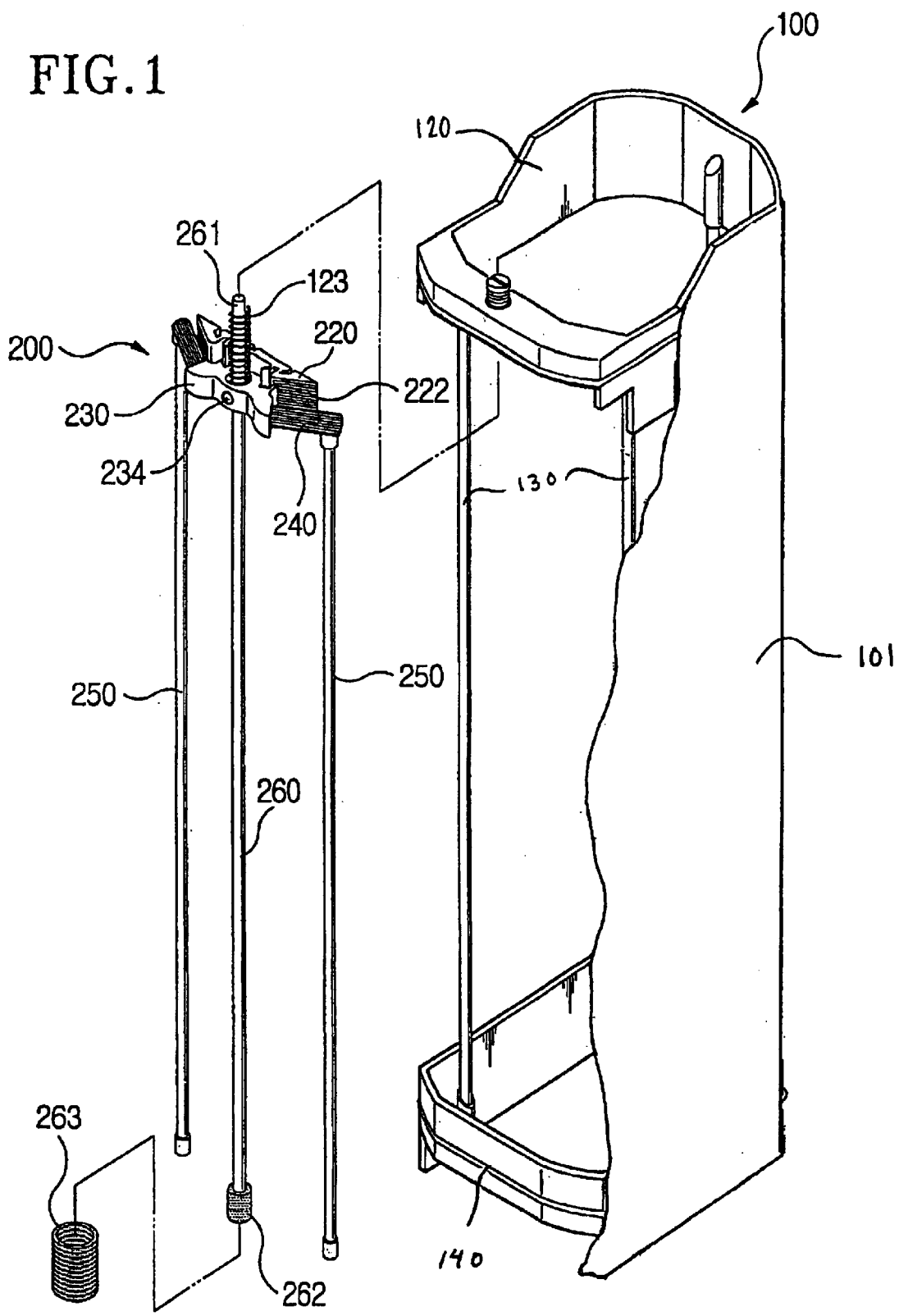
FIG. 1 is a perspective view for illustrating a frame of a golf bag with an automatically collapsible prop according to the present invention, which is shown disassembling from the golf bag for illustration convenience.
Figure 3:
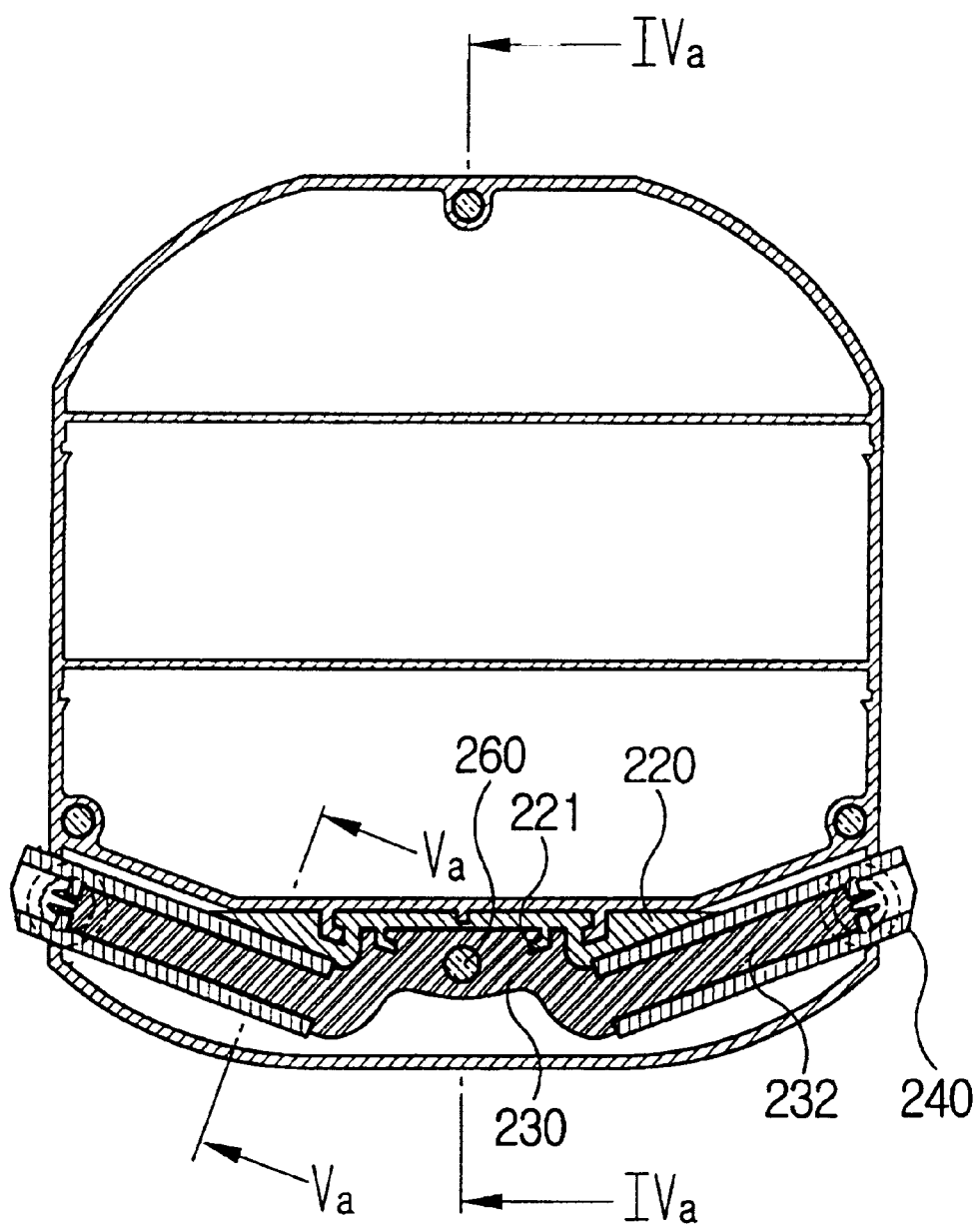
FIG. 3 is a horizontal cross sectional view of the top shaping part of the frame of a golf bag according to the present invention to illustrate the relationship between the parts of the inventive prop.

Referring to FIG. 1, there is shown a frame or skeleton 100, which is covered with a fabric (101) to form a golf bag. The frame 100 includes a top and a bottom shaping part 120 and 140 for shaping the size of the opening of the golf bag, and a plurality of rigid poles 130. The rigid poles 130 connect the top and bottom shaping parts 120 and 140 so as to form a space approximating the length of a golf club between them. The automatically collapsible prop 200 for propping the golf bag is fastened to the top shaping part 120 of the frame 100, as shown in FIGS. 1 and 3.

Figure 2:
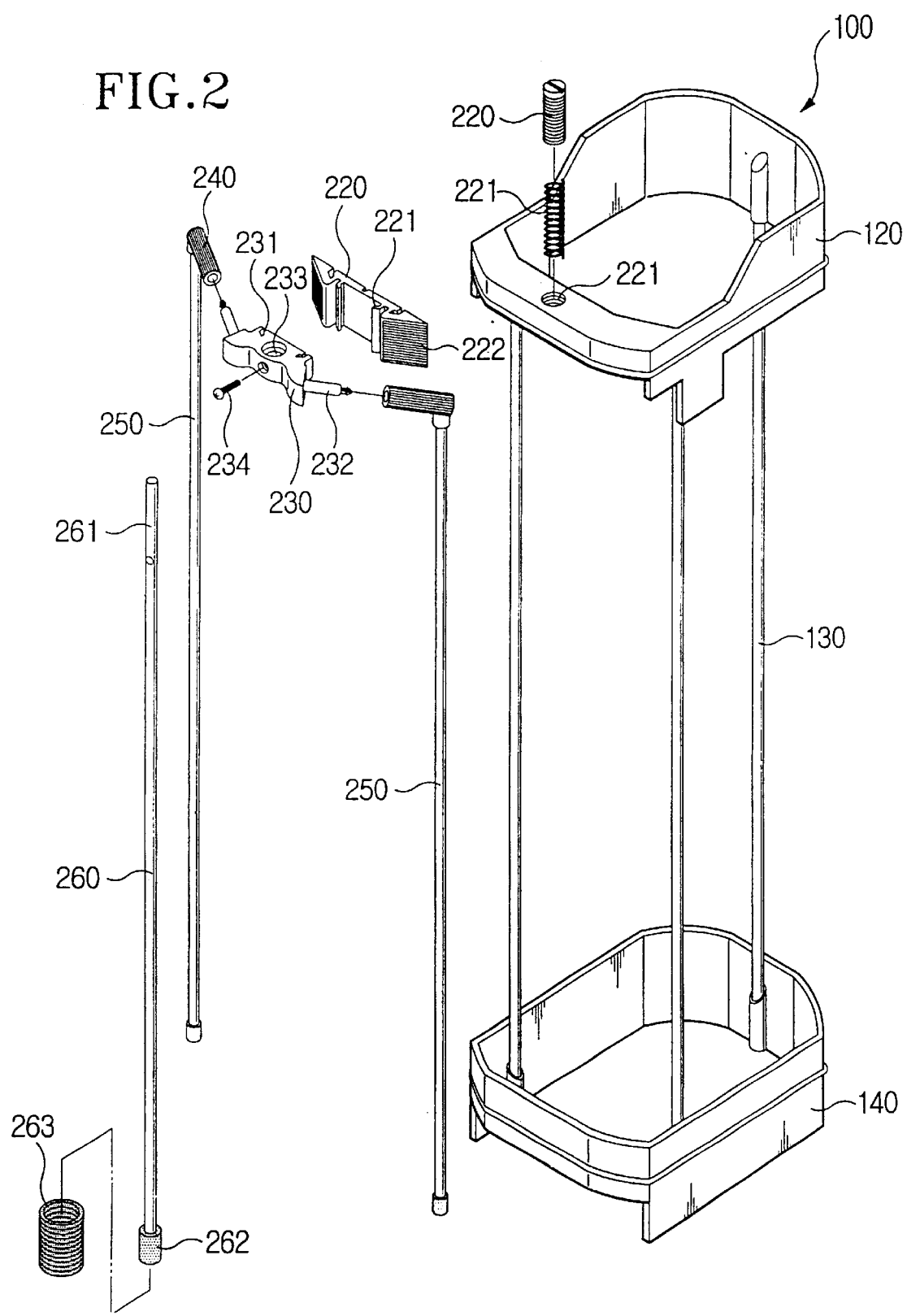
FIG. 2 is an exploded perspective view for illustrating the structural relationship between the parts of the automatically collapsible prop shown in FIG. 1.

Referring to FIGS. 1 and 2, the automatically collapsible prop 200 comprises a rack member 220 fastened to the top shaping part 120, a slide mechanism 230, a pair of pinions 240, a pair legs 250, and a lever rod 260.

The rack member 220, as shown in FIG. 2, includes a central guide rail part 221 formed between two side tooth parts 222 with a number of elongated parallel teeth. The side tooth parts 222 are inclined toward the inside of the golf bag symmetrically to each other. The guide rail part 221 comprises a pair of rails with approximately L-shaped cross sections symmetrically arranged to each other.

Referring to FIG. 2, the slide mechanism 230 has a central support part held and guided by the guide rail part 221, and a pair of pinion support parts 232 symmetrically and integrally formed with the central support part. The central support part is provided with a pair of grooves 231 corresponding to the rails of the guide rail part 221 for respectively and slidingly catching the rails.

The pair of pinions 240 are rotatably mounted on the respective pinion support parts 232 of the slide mechanism 230 so as to respectively engage the two side tooth parts 222. The legs 250 are respectively connected to the pair of pinions 240. Preferably, the pinions 240 are respectively provided with leg connectors 251 for detachably attaching the legs 250, as shown in FIGS. 5A to 7.

The lever rod 260, as shown in FIGS. 1 to 4A, is fastened to the slide mechanism 230 with its one end part 261 projected upward through the central support part of the slide mechanism 230. It serves to move the slide mechanism 230 upward by pushing the other end 262 against the ground. The other end 262 may be preferably inserted in a bellows 263 attached to the bottom shaping part 140. The bellows 263 imparts flexibility to the portion of the bottom shaping part 140 holding the other end 262 when pushing the other end 262 against the ground. As best shown in FIGS. 2 and 4b, the bellows 263 includes a generally accordion shape, whereby the accordion shape allows the bellows 263 to contract and expand in response to axial movement of the lever rod 260.

The lever rod 260 is inserted through a vertical shaft hole 233 formed in the central support part of the slide mechanism 230, fastened thereto by means of a screw 234, as shown in FIGS. 1 to 4A. The length of the lever rod 260 projected from the central support part is long enough to go into the inlet of a through threaded hole 121 formed in the top shaping part 120. A screw cap 122 is provided to close the upper end of the through threaded hole 121 by engaging its threads. The screw cap 122 is made with a hollow to receive the one end of the lever rod 260.

Figure 4A:
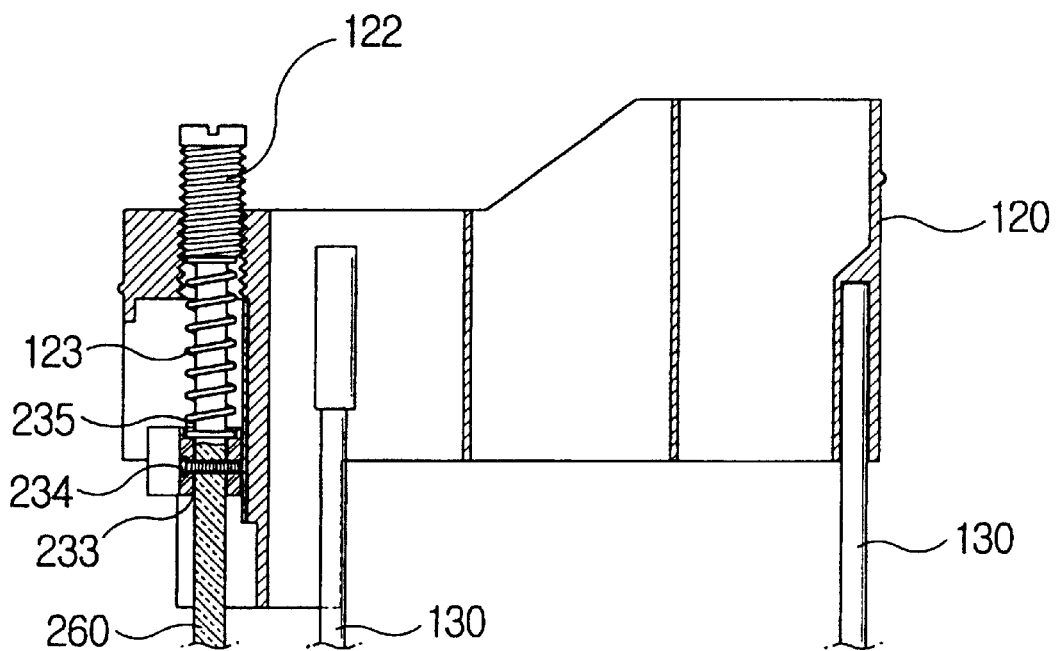
FIG. 4A is a cross sectional view taken along line IVa—IVa of FIG. 3 for illustrating the lever rod fastened to the slide mechanism by means of a screw.
Figure 4B:
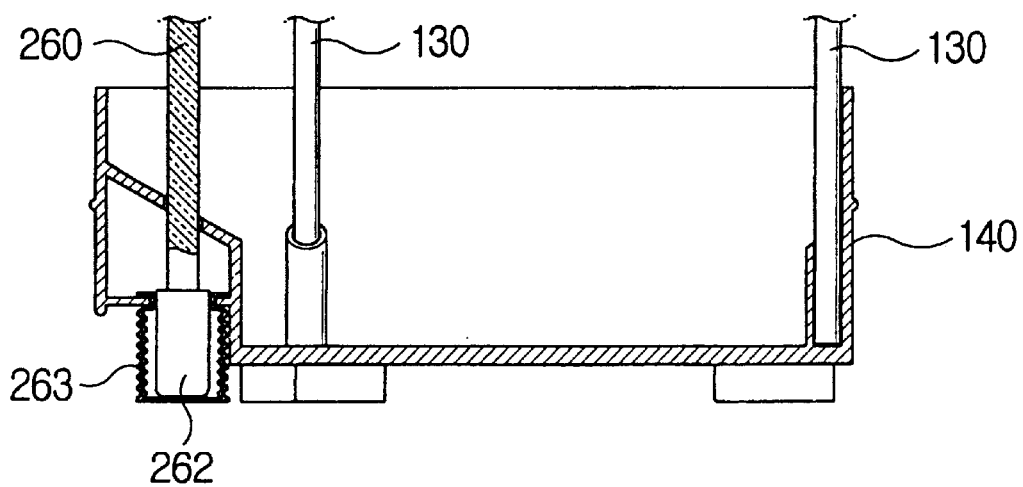
FIG. 4B is a cross sectional view taken along line IVa—IVa of FIG. 3 for illustrating the lower end of the leg inserted in a bellows.

Referring to FIGS. 1, 2 and 4A, a coil spring 123 is mounted between the central support part of the slide mechanism 230 and the lower end of the screw cap 122 for normally pushing the slide mechanism 230 downward. Preferably, the coil spring 123 is interposed between the lower end of the screw cap 122 in the through threaded hole 121 and a seat 235 formed on the upper end of the vertical shaft hole 233, as shown in FIG. 4A. The resilient force of the coil spring 123 for normally pushing the lever rod 260 downward may be adjusted by changing the distance between the inlet end of the through threaded hole 121 and the lower end of the screw cap 122 therein. Turning the screw cap 122 can make such changing.

Figure 6:
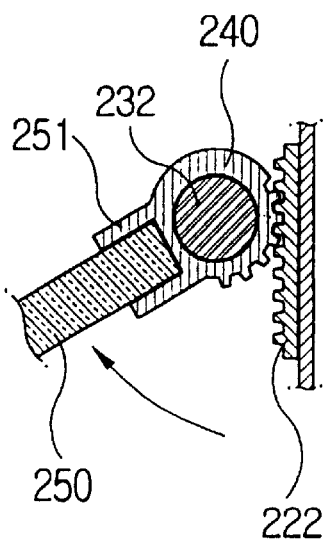
FIG. 6 is a cross sectional view similar to FIG. 5B but with the pinion having teeth on the portion of the periphery to contact during operation.
Figure 7:
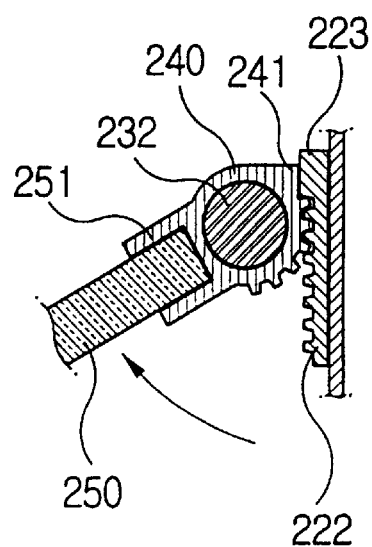
FIG. 7 is a cross sectional view similar to FIG. 6 but with the pinion stopper plane of the pinion contacting the rack stopper plane of the rack member.

Referring to FIGS. 6 and 7, the pinion 240 preferably has teeth only formed on the portion of its periphery to contact the side tooth part 222 during operation. Preferably, referring to FIG. 7, the pinion 240 has a pinion stopper plane 241 formed at the end of the tooth part that most strongly contacts the side tooth part 222 in the triangular rest position. The side tooth part also has a rack stopper plane 223 for contacting the pinion stopper plane 241 at a proper position.

Figure 5A:
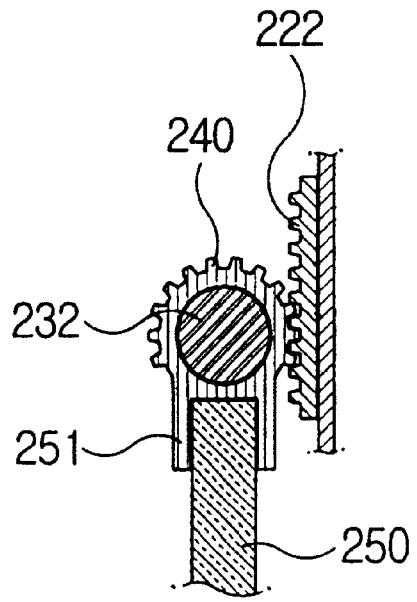
FIG. 5A is a cross sectional view taken along line Va—Va of FIG. 3 for illustrating the pinion in the normally collapsed carriage position.
Figure 5B:
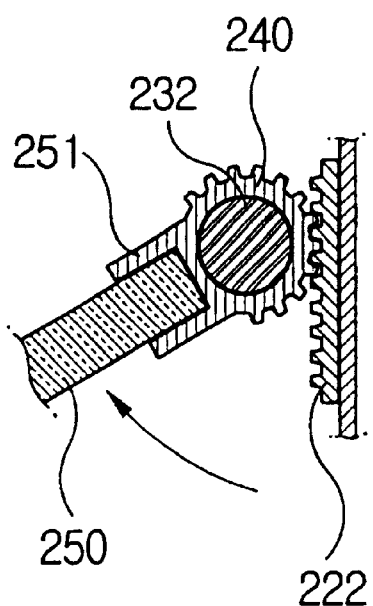
FIG. 5B is a cross sectional view similar to FIG. 5A but with the pinion in the triangular rest position.

In operation, pushing the lower end of the lever rod 260 against the ground causes the slide mechanism 230 to move upward and overcome the resilient force of the coil spring 123. Then, the pinions 240, as shown in FIGS. 5B to 7, rotate clockwise by the engagement with the side tooth parts 222 to spread the legs 250 into a triangular rest position with respect to the frame 100. On the contrary, releasing the lower end of the lever rod 260, the slide mechanism 230 moves automatically downward by the resilient force of the coil spring 123. Then, the pinions 240 rotate counterclockwise by the engagement with the side tooth parts 222 to collapse the legs 250 into the original carriage position, as shown in FIG. 5A.

While the present invention has been described in connection with specific embodiments accompanied by the attached drawings such as a golf bag, it will be readily apparent to those skilled in the art that various changes and modifications may be made thereto without departing the gist of the present invention. For example, the prop can be used to support various other structures.

What is claimed is:

1. An automatically collapsible prop for propping a golf bag having a frame with a top and a bottom shaping part, comprising:

a plurality of rigid poles for connecting said top and bottom shaping parts so as to form a space approximating the length of a golf club between them, said bottom shaping part having a lower surface with a stepped portion;

a rack member fastened to said top shaping part having a central guide rail part formed between two side tooth parts with a number of elongated parallel teeth, said side tooth parts being inclined toward the inside of said golf bag symmetrically to each other;

a slide mechanism having a central support part held and guided by said guide rail part, and a pair of pinion support parts symmetrically and integrally formed with said central support part;

a pair of pinions rotatably mounted on the respective pinion support parts of said slide mechanism so as to respectively engage said two side tooth parts;

a pair of legs respectively connected to said pair of pinions;

a lever rod fastened to said slide mechanism with its one end part projected upward through the central support part of said slide mechanism for moving said slide mechanism upward by pushing the other end against the ground;

a through threaded hole formed in said top shaping part operable to receive said one end part of said lever rod;

a screw cap made with a hollow to receive the one end of said lever rod for closing the upper end of said through threaded hole by engaging its threads;

an accordion-shaped bellows located in said stepped portion of said lower surface of said bottom shaping part and within an outer periphery of said bottom shaping part, said bellows receiving a lower end of said lever rod; and a coil spring mounted between the central support part of said slide mechanism and the lower end of said screw cap for normally pushing said slide mechanism downward, wherein if the other end of said lever rod is pushed against ground, said slide mechanism moves upward overcoming the resilient force of said coil spring so as to rotate said pinions engaged by said side tooth parts and thus to spread said pair of legs in a triangular rest position with respect to said inner frame, while if the other end of said lever rod is released from the ground, said slide mechanism moves downward by the resilient force of said coil spring so as to reversibly rotate said pinions and thus to collapse said pair of legs into the original carriage position wherein said lever rod is positioned within inner portions of said top and bottom shaping parts so that it can be covered with a fabric along with said top and bottom shaping parts.

2. An automatically collapsible prop as defined in claim 1, wherein said guide rail part comprises a pair of rails with approximately L-shaped cross sections symmetrically arranged to each other, and said central support part is provided with corresponding grooves respectively and slidingly catching said pair of rails.

3. An automatically collapsible prop as defined in claim 2, wherein said pair of pinions are respectively provided with leg connectors for detachably attaching said pair of legs.

4. An automatically collapsible prop as defined in claim 3, wherein said lever rod is fastened to said slide mechanism at a point of the central support part by means of a screw.

5. An automatically collapsible prop as defined in claim 4, wherein the projected length of said lever rod from said central support part is long enough to go into the inlet of said through threaded hole.

6. An automatically collapsible prop as defined in claim 5, wherein said pair of pinions have teeth only formed on the portions of their peripheries to contact said side tooth parts during operation.

7. An automatically collapsible prop as defined in claim 6, wherein said pair of pinions have pinion stopper planes formed at the ends of their tooth parts that most strongly contact said side tooth parts in said triangular rest position.

8. An automatically collapsible prop as defined in claim 7, wherein said side tooth parts have rack stopper planes for contacting their respective ones of said pinion stopper planes at the corresponding positions.

9. An automatically collapsible prop as defined in claim 8, wherein said coil spring is interposed between the lower end of said screw cap and a seat formed on the upper end of said central support part surrounding a part of said lever rod.

10. An automatically collapsible prop for supporting a device comprising:

a frame with a top and a bottom shaping part, said bottom shaping part having a lower surface with a stepped portion;

a plurality of rigid poles for connecting said top and bottom shaping parts so as to form a space between them;

a rack member fastened to said top shaping part having a central guide rail part formed between two side tooth parts with a number of elongated parallel teeth, said side tooth parts being inclined toward the inside of said device symmetrically to each other;

a slide mechanism having a central support part held and guided by said guide rail part, and a pair of pinion support parts symmetrically and integrally formed with said central support part;

a pair of pinions rotatably mounted on the respective pinion support parts of said slide mechanism so as to respectively engage said two side tooth parts;

a pair of legs respectively connected to said pair of pinions;

a lever rod fastened to said slide mechanism with its one end part projected upward through the central support part of said slide mechanism for moving said slide mechanism upward by pushing the other end against the ground;

a through threaded hole formed in said top shaping part for receiving said one end part of said lever rod;

a screw cap made with a hollow to receive the one end of said lever rod for closing the upper end of said through threaded hole by engaging its threads;

an accordion-shaped bellows located in said stepped portion of said lower surface of said bottom shaping part and within an outer periphery of said bottom shaping part, said bellows receiving a lower end of said lever rod; and a coil spring mounted between the central support part of said slide mechanism and the lower end of said screw cap for normally pushing said slide mechanism downward, wherein if the other end of said lever rod is pushed against the ground, said slide mechanism moves upward overcoming the resilient force of said coil spring so as to rotate said pinions engaged by said side tooth parts and thus to spread said pair of legs in a triangular rest position with respect to said inner frame, while if the other end of said lever rod is released from the ground, said slide mechanism moves downward by the resilient force of said coil spring so as to reversely rotate said pinions and thus to collapse said pair of legs into the original carriage position wherein said lever rod is positioned within inner portions of said top and bottom shaping parts so that it can be covered with a fabric along with said top and bottom shaping parts.

11. An automatically collapsible prop as defined in claim 10, wherein said guide rail part comprises a pair of rails with approximately L-shaped cross sections symmetrically arranged to each other, and said central support part is provided with corresponding grooves respectively and slidingly catching said pair of rails.

12. An automatically collapsible prop as defined in claim 11, wherein said pair of pinions are respectively provided with leg connectors for detachably attaching said pair of legs.

13. An automatically collapsible prop as defined in claim 12, wherein said lever rod is fastened to said slide mechanism at a point of the central support part by means of a screw.

14. An automatically collapsible prop as defined in claim 13, wherein the projected length of said lever rod from said central support part is long enough to go into the inlet of said through threaded hole.

15. An automatically collapsible prop as defined in claim 14, wherein said pair of pinions have teeth only formed on the portions of their peripheries to contact said side tooth parts during operation.

16. An automatically collapsible prop as defined in claim 15, wherein said pair of pinions have pinion stopper planes formed at the ends of their tooth parts that most strongly contact said side tooth parts in said triangular rest position.

17. An automatically collapsible prop as defined in claim 16, wherein said side tooth parts have rack stopper planes for contacting their respective ones of said pinion stopper planes at the corresponding positions.

18. An automatically collapsible prop as defined in claim 17, wherein said coil spring is interposed between the lower end of said screw cap and a seat formed on the upper end of said central support part surrounding a part of said lever rod.

* * * * *